(12) United States Patent
Denkel (10) Patent No.: US 11,210,205 B2
(45) Date of Patent: Dec. 28, 2021

(54) APPLICATION DEBUGGING

(71) Applicant: SAP SE, Walldorf (DE)

(72) Inventor: Christian Denkel, Jöhlingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/814,670

(22) Filed: Mar. 10, 2020

(65) Prior Publication Data

US 2021/0271589 A1    Sep. 2, 2021

Related U.S. Application Data

(60) Provisional application No. 62/982,980, filed on Feb. 28, 2020.

(51) Int. Cl.
*G06F 11/36* (2006.01)
*H04L 29/06* (2006.01)

(52) U.S. Cl.
CPC ...... *G06F 11/3664* (2013.01); *G06F 11/3688* (2013.01); *H04L 67/42* (2013.01)

(58) Field of Classification Search
CPC . G06F 11/3664; G06F 11/362; G06F 11/3668
See application file for complete search history.

(56) References Cited

U.S. PATENT DOCUMENTS

| | | | | |
|---|---|---|---|---|
| 8,180,845 B2* | 5/2012 | Brendle | ............... | H04L 29/06 709/217 |
| 2015/0193328 A1* | 7/2015 | Deakin | ............... | G06F 9/45558 714/38.1 |
| 2016/0062745 A1* | 3/2016 | Rao | ............... | G06F 8/33 717/109 |
| 2018/0121323 A1* | 5/2018 | Tucker | ............... | G06F 11/3664 |
| 2019/0102280 A1* | 4/2019 | Caldato | ............... | G06F 9/5072 |

* cited by examiner

*Primary Examiner* — Duy Khuong T Nguyen
(74) *Attorney, Agent, or Firm* — Mintz Levin Cohn Ferris Glovsky and Popeo, P.C.

(57) ABSTRACT

A method, a system, and a computer program product for debugging of software applications. A first identifier is assigned to a debugging request received from a software application for debugging a transaction executed by the software application. Based on the assigned first identifier, a connection request to a debugger is executed. The debugger generates an interface to a backend computing system that stores a resolution of the debugging request. A second identifier is associated with the generated interface. Based on the received second identifier, a connection between the software application and the generated interface is established. Using the first identifier, the resolution of the debugging request is obtained from the backend system. The resolution is transmitted to the debugging request for display by the software application.

14 Claims, 7 Drawing Sheets

FIG. 6

APPLICATION DEBUGGING

The present application claims priority to U.S. Provisional Patent Appl. No. 62/982,980 to Denkel, filed Feb. 28, 2020, and entitled "Application Debugging", and incorporates its disclosure herein by reference in its entirety.

TECHNICAL FIELD

This disclosure relates generally to data processing and, in particular, to debugging of software applications.

BACKGROUND

Today, many companies and individuals rely on effective operation of software applications in conducting their daily activities. The software applications include internet browsing applications, financial software applications, sales applications, and/or many other types of applications. Software is typically used by individuals on a variety of devices (e.g., mobile devices, personal computers, etc.) to perform a variety of tasks. Periodically, it is important monitor and/or track actions executed by the software for debugging purposes to ensure, for example, proper and/or efficient operation of the software applications, detection of harmful activities, assembling statistics relating to the usage of software application, and/or for many other reasons.

Typically, users have various controls in recording and debugging of various transactions being executed by the software applications running on computing workstations. However, this may not be the case for all software applications, especially those that expose only a view to the full transaction that may be executed at a backend system. In this case, the devices do not have the same capabilities for recording transactions or controlling the debugging process. Thus, there is a need to provide for an effective and efficient way of recording transactions as well as controlling of debugging of software applications.

SUMMARY

In some implementations, the current subject matter relates to a computer implemented method for debugging a software application. The method may include assigning a first identifier to a debugging request received from a software application for debugging a transaction executed by the software application, and executing, based on the assigned first identifier, a connection request to a debugger. The debugger may generate an interface to a backend computing system storing a resolution of the debugging request, and associating a second identifier with the generated interface. The method may further include establishing, based on the received second identifier, a connection between the software application and the generated interface, obtaining, using the first identifier, the resolution of the debugging request from the backend system, and transmitting the resolution to the debugging request for display by the software application.

In some implementations, the current subject matter can include one or more of the following optional features. In some implementations, the assigning of the first identifier may include receiving the debugging request from the software application using an open data protocol. The transmission of the resolution may include transmitting the resolution of the debugging request to the software application using an open data protocol.

In some implementations, establishment of the connection may include generating a graphical user interface for display by the software application for controlling the debugging of the transaction executed by the software application. The connection between the software application and the generated interface may be established using a WebSocket protocol. At least one of the executing, the establishing and the obtaining may be performed using a representational state transfer protocol.

In some implementations, the software application may include at least one of the following: a mobile application, a software application being executed on a mobile computing device, a software application being executed on a non-mobile computing device, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide a debugging service for software applications.

During runtime, software applications executed on various computing devices may run into various error scenarios (e.g., wrong user data, missing user data, etc.). This may cause software applications to be placed into an inconsistent state (e.g., become inoperable, terminate, etc.). Determining a cause of the generated error may be difficult as software applications typically do not include an ability to record some or all of the transactions that are executed because only a view to the full transactions being executed on a backend computing system, may be exposed to the software application. Moreover, software applications might not include appropriate control functionalities that may be activated for recording steps executed by the application. Even if some of the transactions may be recorded, those might not be sufficient in specific error scenarios to determine the cause of the error. In some implementations, the current subject matter provides an ability to debug software applications using a debugging service. The debugging service may be configured to be serve as an intermediary between the software application and a backend computing system, which may be configured to provide resolution to various error scenarios. The debugging service may be configured to communicate with the software application that has been placed into a debugging state. The software applications may include mobile software applications running on mobile computing devices as well as software applications running on non-mobile devices.

In the debugging state, transactions that are executed by the software application may be recorded. The debugging service may be configured to receive information from the software application and assign one or more identifiers to errors generated as a result of execution of various transactions by software applications. The errors with the assigned identifier may be transmitted to the debugger, which in turn communicates with a backend computing system to obtain a resolution to the identified problem.

A debugger may be configured to use an interface (e.g., along with a web graphical user interface (e.g., WebGUI)) for communicating with the backend computing system. In some implementations, the debugging service may be disposed in a cloud computing environment and may be configured to communicate with the software application via an open data protocol service (OData service), which may be configured for building and consuming RESTful application programming interfaces (APIs). Representational state transfer (REST) is a software architecture that defines a set of constraints for creating various web services. Web services conforming to the REST architecture may be referred to as RESTful web services. These services may be configured to provide interoperability between various computing systems on a network (e.g., the Internet). RESTful web services may further allow access and/or manipulation of textual representations of web resources using a uniform and/or predefined set of stateless operations.

Figure 5:
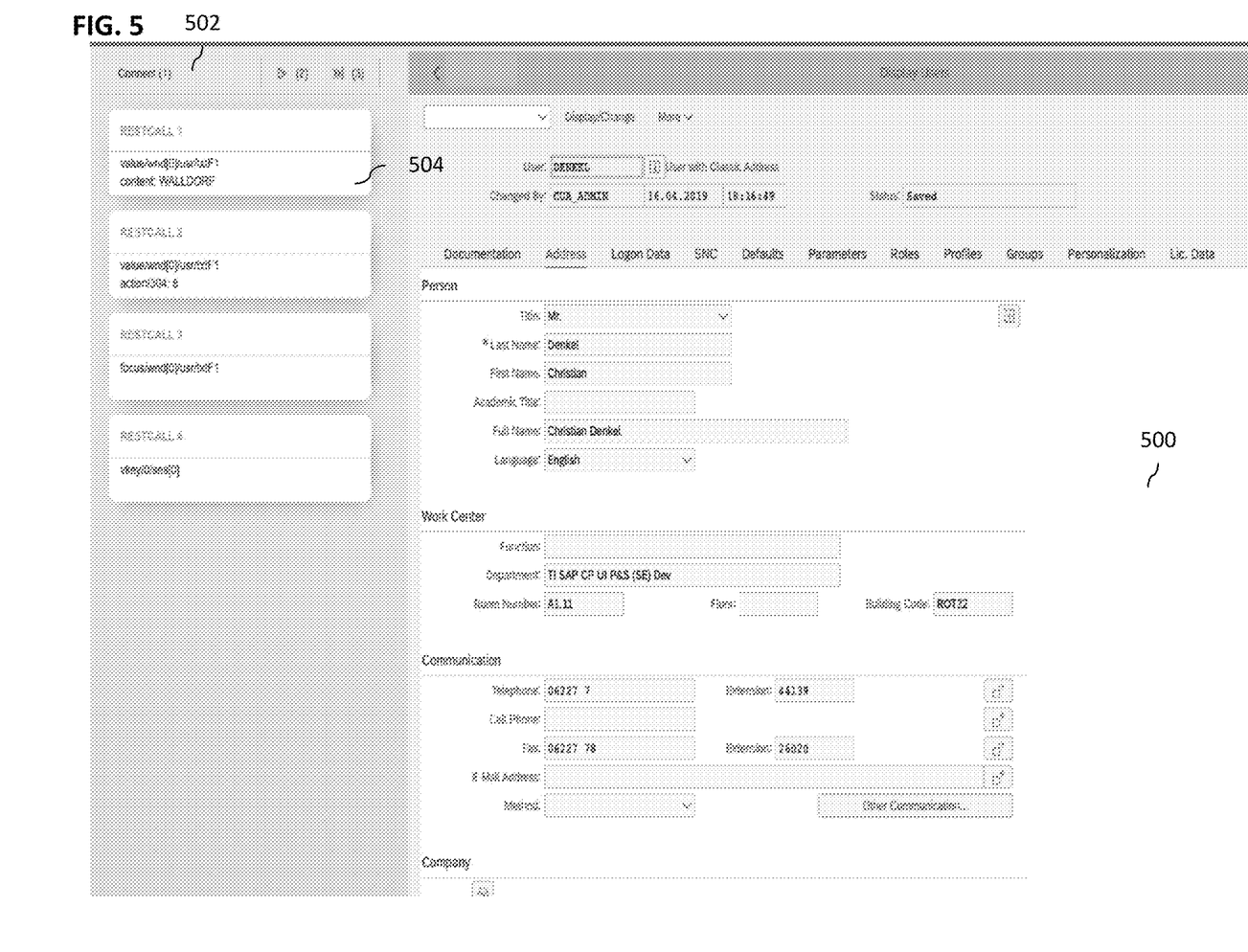
FIG. 5 illustrates an exemplary user interface that may be displayed by the software application, according to some implementations of the current subject matter.

In some implementations, the current subject matter may be configured to provide a web graphical user interface (WebGUI) that may be configured to include one or more debugging controls as well as display one or more errors that may have been detected by the debugger (as shown in the exemplary user interface 500 illustrated in FIG. 5). The user interface may be configured to include a dialog and/or messaging area/applet that may be used for resolving identified errors. The WebGUI may be configured to be "attached" to the mobile runtime environment and may be configured to operate together with the cloud-based debugging service and a debugger user interface, where the debugging service may be configured act as an intermediary between the software application and the debugger user interface. The debugger user interface may be configured to embed the WebGUI into an inline frame ("iFrame")—an HTML document that may be embedded inside another HTML document on a website.

Figure 1:
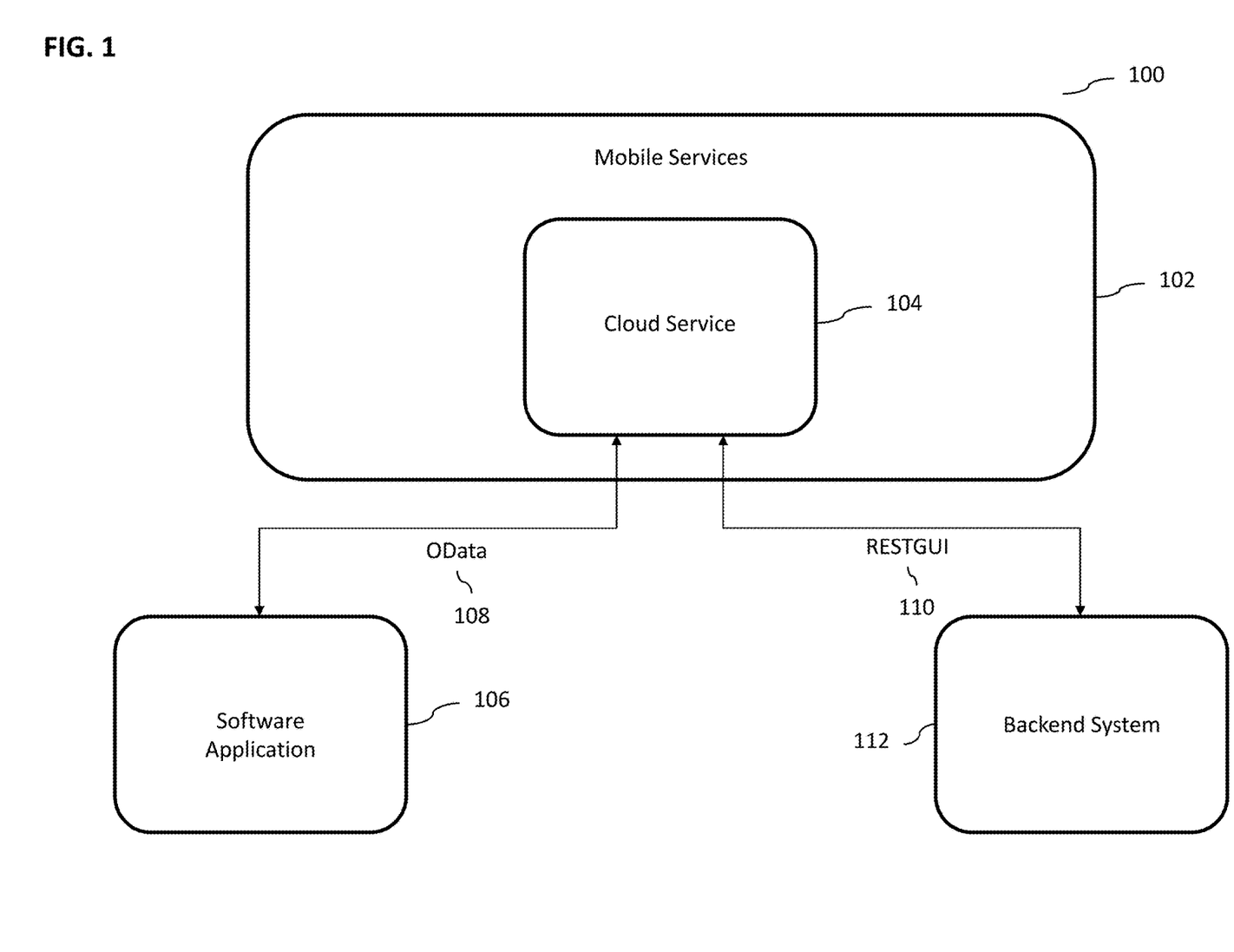
FIG. 1 illustrates an exemplary system for debugging of software applications, according to some implementations of the current subject matter.

FIG. 1 illustrates an exemplary system 100 for debugging of software applications, according to some implementations of the current subject matter. The system 100 may include a service component 102 that may include a cloud service component 104, a computing device that may be configured to execute a software application 106, and a backend computing system 112. The software application may be designed for execution as a mobile application on a mobile computing device, and/or as an application for execution on a non-mobile computing device.

The computing device may be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, and/or any other devices and/or any combination thereof. In some exemplary implementations, the computing device may include HTML rendering capabilities, JavaScript running/execution capabilities, and/or can perform any other functionalities. The computing device may include a software, a hardware and/or any combination thereof capable of performing at least one transaction related to software application 106. For example, the transaction may include transmitting an HTTP request to a server for an HTML page for presentation at the computing device (e.g., displaying in a user interface of the software application 106 the HTML page in a browser application). The computing device may also perform any type of transactions, which may include interactions with the mobile services 102 and/or any other third parties and/or third party applications. The interactions may implement use of the OData protocol 108.

The mobile services 102 may be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, a data center, and/or any other devices and/or any combination thereof. The mobile services 102 may include a software, a hardware and/or any combination thereof that can provide applications, data, and/or any other information to the computing device. The applications, data, and/or information provided by the mobile services 102 may be used for the purposes of debugging a particular transaction executed and/or recorded by the software application 106. The mobile services 102 may include a cloud service 104 (e.g., an OData service) that may be used for communicating debug information between the software application 106 and the backend computing system 112. The mobile services 102 may also store various information associated with debugging of the software application 106.

The backend system 112 may be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, a data center, and/or any other devices and/or any combination thereof. The backend system 112 maybe configured to provide various debugging services in response to receiving data relating to various errors associated with execution of the software application 106. The backend system 112 may also process various debug data/information collected by the software application 106 to determine an appropriate debugging action that may need to be executed/implemented at the software application. The system 112 may be configured to store various information/data/computing routines for resolving various errors. In some exemplary implementations, the backend system 112 may be configured to communicate with the mobile services 102 using the REST communication protocol.

The components 102, 106, and/or 112 may be any type of wireless network, wired network, metropolitan area network ("MAN"), wide area network ("WAN"), local area network ("LAN"), virtual local area network ("VLAN"), Internet, intranet, extranet, and/or any other type of network, and/or any combination thereof.

Figure 2:
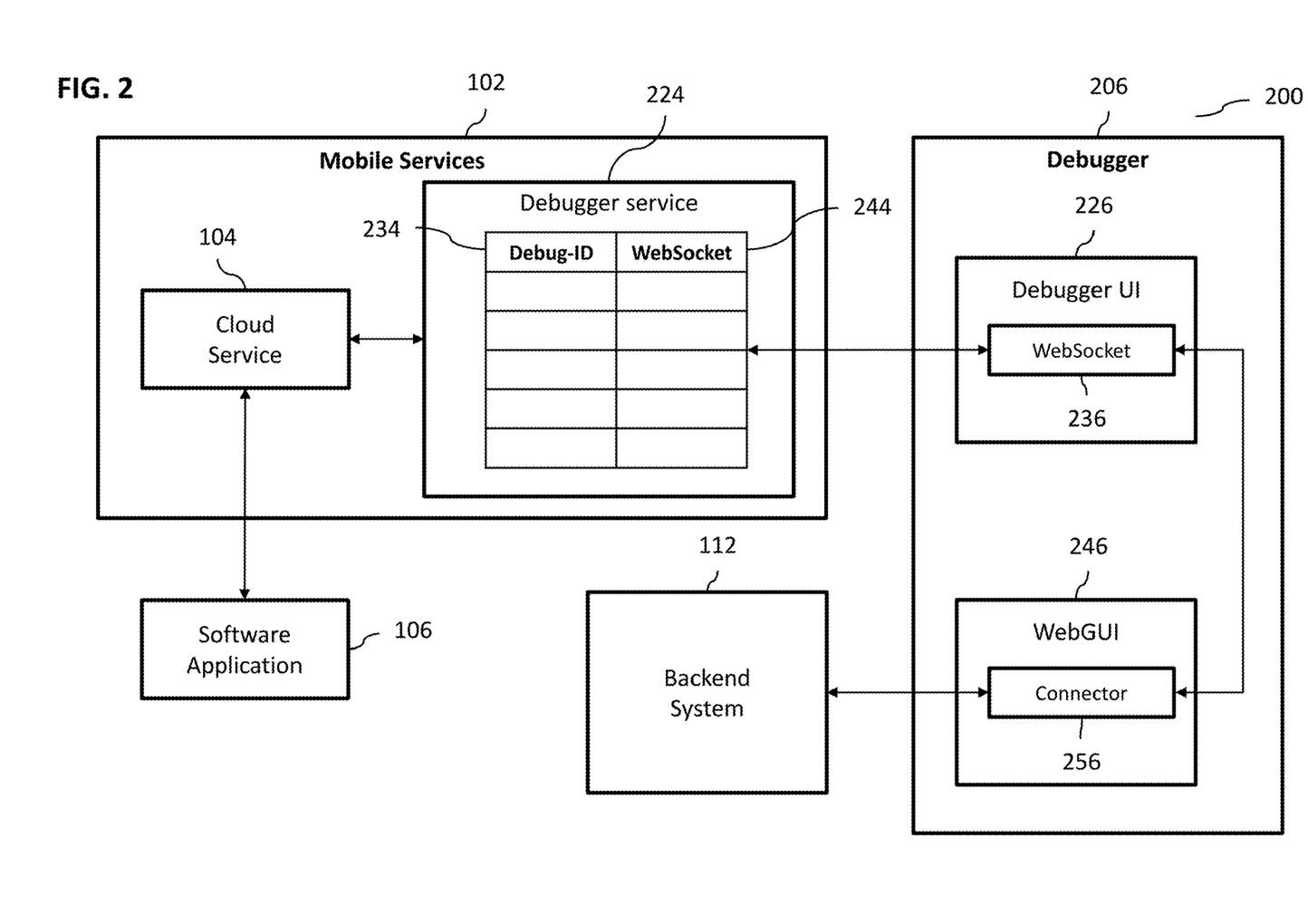
FIG. 2 illustrates an exemplary debugging runtime system, according to some implementations of the current subject matter.

FIG. 2 illustrates an exemplary debugging runtime system 200, according to some implementations of the current subject matter. The system 200 may be configured to include one or more components of the system 100 shown in FIG. 1. As shown in FIG. 2, the system 200 may include the software application 106, the mobile services component 102, a debugger component 206, and the backend computing system 112.

The mobile services component 102 may be configured to include the cloud service component 104 (e.g., OData service) and a debugger service component 224. The cloud service component 104 may be communicatively coupled to the debugger service component 224. In some exemplary implementations, the REST communication protocol may be used connect the components 104 and 224. The debugger service component 224 may be also communicatively coupled to the debugger component 206. In some exemplary implementations, the debugger component 206 may be connected to the debugger component 206, and in particular to its debugger user interface 226, using the REST communication protocol.

The debugger service component 224 may be configured to service as an intermediary between the cloud service component 104 and the debugger user interface component 226. In particular, the component 224 may be configured to associate various requests for debugging that may be received from the software application 106 and assigned a specific debugging identifier ("Debug-ID") 234 with a specific WebSocket identifier 244. A WebSocket protocol may be configured to provide a bi-directional communications channel over a Transmission Control Protocol/Internet Protocol ("TCP/IP") socket. The Web Socket protocol may be designed to be implemented in web browsers and/or web servers and may be used by any client and/or server application.

The debugger component 206 may include the debugger user interface component 226, which may include a Web Socket component 236, and a WebGUI component 246 having a WebGUI connector component 256. The debugger user interface component 226 may be configured to be used for performing debugging requests that may be received from the software application 106. The WebSocket component 236 may be configured to be connected to the debugger service component 224. The connection may be accomplished using REST communication protocol. The Web Socket component 236 may also be connected to the connector component 256 of the WebGUI component 246. The WebGUI component 246 may be configured to be a frontend to the backend system 112. The connector component 256 may be used for connection to the backend system 112 for obtaining a debugging solution for one or more debugging requests received from the software application 106.

In some implementations, the cloud service component 104 may be a stateless cloud service component and the backend system 112 may be a stateful backend system. The software application 106 and/or the cloud service component 104 may implement a transaction recorder tool that may be configured to record each transaction that may be executed by the software application 106. The recording may include all requisite calls (e.g., in accordance with the RESTGUI protocol) that the WebGUI component may transmit to the backend system 112 for the purposes of executing the transaction. The cloud service component 104 may be configured to generate an application programming interface for interaction with the recorded controls at the backend system 112. The application programming interface may be used by the software application to obtain requisite debugging information from the backend system 112.

In some implementations, the system 200 may be configured to operate in a handshake state and an application state. During a handshake state, the components of the system may be configured to execute various connection requests. In particular, once the software application (e.g., a user manually activating debug function, software application automatically switching to debug state) switches to the debug mode, the software application may be configured to connect (e.g., via the cloud service component 104) to the debugger service component 224 and request a new debug context, e.g., a debugID 234 to identify a particular debug request. In some implementations, the requested debugID 234 may be configured to be displayed in a graphical user interface of the software application. Subsequent to the assignment of the debugID 234, the debugger user interface component 226 may be switching a connection mode, e.g., manually (e.g., pressing a "connect" button, automatically, etc.), which request providing of the assigned debugID 234. After providing the debugID 234, the debugger user interface 226 may be configured to generate a Web Socket connection to the debugger service component 224 and transmit the assigned debugID 234. This may result in establishing a connection between the software application and the debugger user interface component 226.

Once the connection is established, the system 200 may be configured to enter into a runtime application mode, whereby debugging requests generated by the software application 106 may be addressed. In the connected runtime mode, every request from the software application 106 to the cloud service component 104 may be configured to include the assigned debugID 234 (e.g., it may be incorporated into an HTTP header field of the request). The cloud service component 104 may be configured to detect the assigned the debugID 234 and, instead of transmitting software application's requests directly to the backend system 112, it may transmit to the debugger service component 224. The Web Socket connection that may be established with the debugger user interface component 226 may be used for transmission of such requests. The debugger user interface component 226 may be configured to also display all debug requests that have been received from the software application 106 via the Web Socket connection. The requests may correspond to specific transactions executed by the software application (which may or may not require debugging). The requests may then be selectively executed on a step by step basis and results of such execution may be displayed in the WebGUI component 246.

Figure 3:
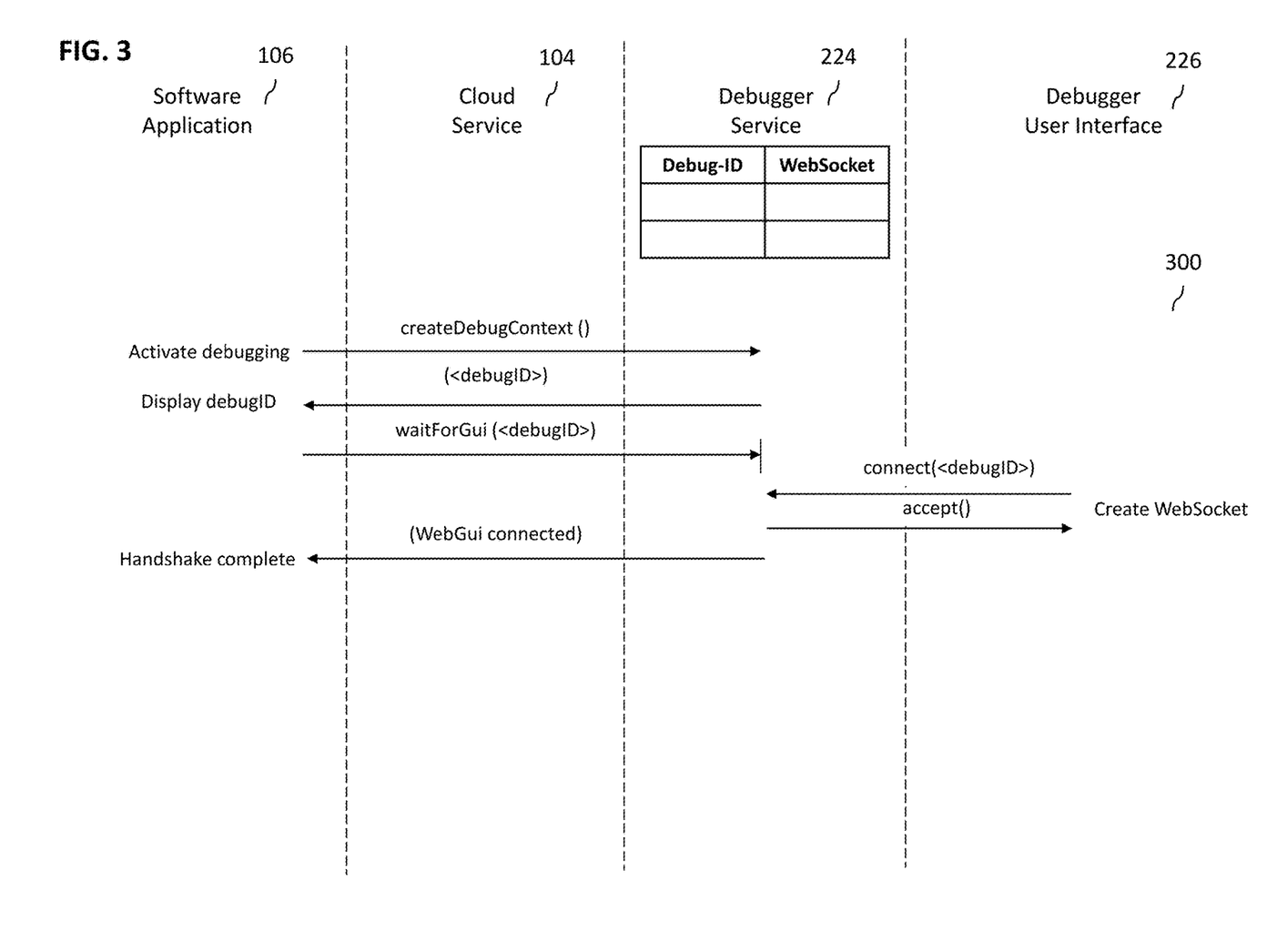
FIG. 3 illustrates an exemplary handshake process, according to some implementations of the current subject matter.

FIG. 3 illustrates an exemplary handshake process 300, according to some implementations of the current subject matter. The process 300 may be configured to be executed between the software application 106, the cloud service component 104, the debugger service component 224 and the debugger user interface component 226. As stated above, the process 300 may be used to connect various components of the system 200.

To initiate the handshake process 300, the software application may be configured to activate a debugging feature (e.g., application, mode, etc.). This may be performed manually, automatically, and/or in any other way. Activation of the debugging feature may be transmitted to the debugger service component 224 via the cloud service component 104 using a createDebugContext( ) command.

The debugger service component 224 may be configured to assign a particular debugID 234 and transmit it (<debugID>) to the software application 106 via the cloud service component 104. The <debugID> may be displayed by the software application 106.

The software application 106 may be configured to enter into a waiting state to await connection with the debugger user interface component 226. The connection may be associated with the assigned debugID 234. The debugger service component 224 may be configured to transmit a connect request to the debugger user interface component 226 of the debugger 206. The connection request may be transmitted along with the assigned debugID (e.g., connect (<debugID>)).

Upon receipt of the connection request, the debugger user interface component 226 may be configured to generate a WebSocket connection (e.g., Create WebSocket). It may also transmit an acceptance of the connection to the debugger service component 224 (e.g., accept( )). Upon receipt of the acceptance of the connection, the debugger service component 224 may be configured to notify the software application 106 that connection has been established and that the software application may be connected directly to the WebGUI component 246 for execution of debugging procedures (e.g., (WebGUI Connected)). At this point, the handshake procedure may be completed and the software application 106 may be configured to enter into debugging runtime mode, as discussed below.

Figure 4:
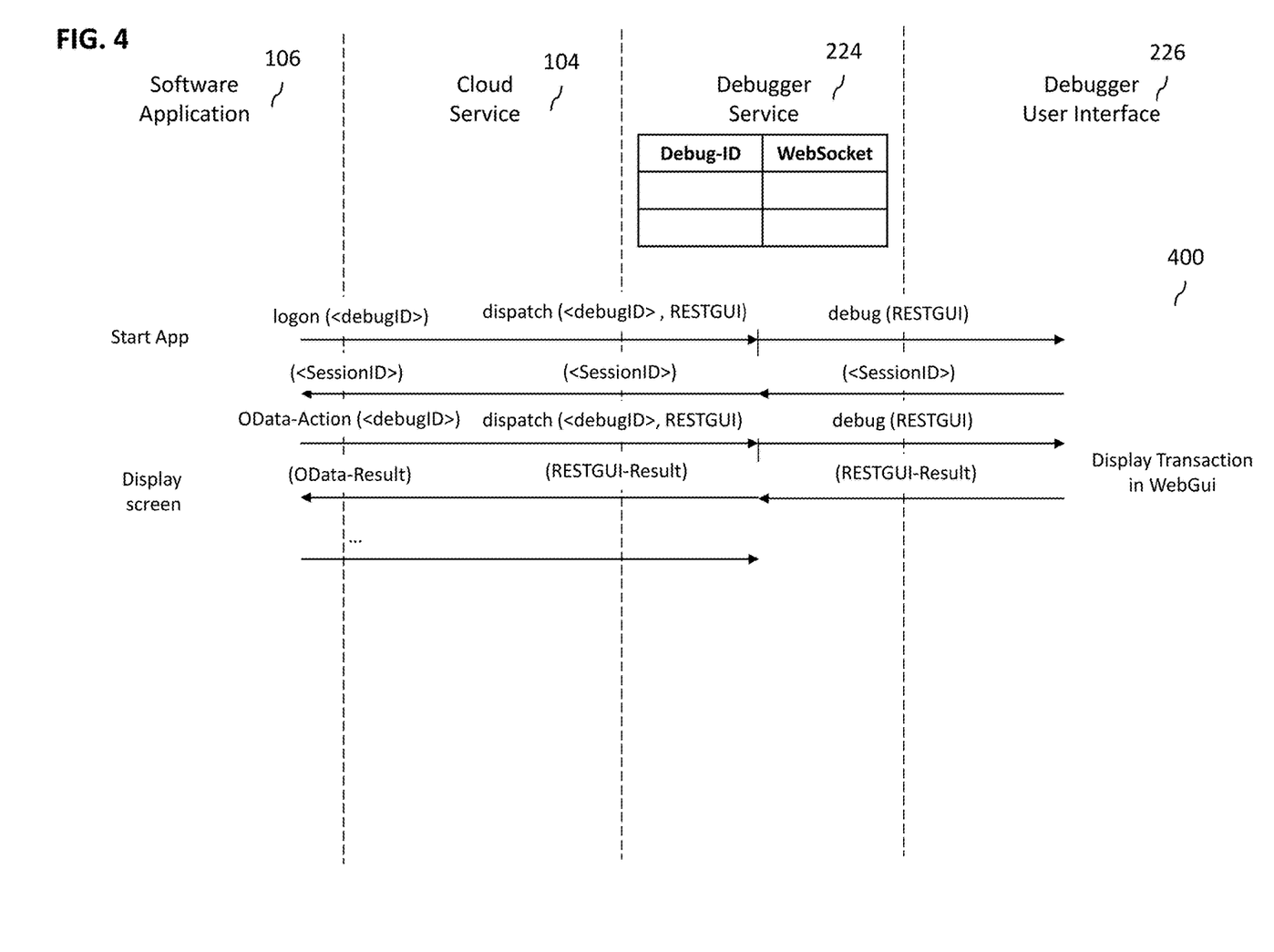
FIG. 4 illustrates an exemplary debugging runtime mode process, according to some implementations of the current subject matter.

FIG. 4 illustrates an exemplary debugging runtime mode process 400, according to some implementations of the current subject matter. The process 400 may be configured to be executed between the software application 106, the cloud service component 104, the debugger service component 224 and the debugger user interface component 226. As stated above, the process 400 may be used to execute various debugging requests by the software application 206.

Once the software application 106 has been connected to the WebGUI component 246, the debugging application that may be part of the software application 106 may be activated. The software application 106 may use the assigned <debugID> as a logon (e.g., using a logon (<debugID>) command) to the cloud service component 104 for the purposes of executing debugging procedures. The cloud service component 104 may transmit the debugID to the debugger service component 224. The debugID may be transmitted using a RESTGUI transmission protocol (e.g., using dispatch (<debugID>, RESTGUI) command). Since the WebSocket connection has been established during the handshake procedure 300 (shown in FIG. 3), the debugger service component 224 may be configured to transmit a debug request to the debugger user interface component 226 (e.g., using debug (RESTGUI) command).

Upon receiving the debug request from the debugger service component 224, the debugger user interface component 226 may be configured to establish a debugging session that may be identified by a particular session ID (e.g., <SessionID>). The debugger user interface component 226 may transmit the session ID to the software application 106.

The software application 106 may then execute various debugging actions that may be transmitted to the debugger user interface component 226 via the cloud service component 104 and the debugger service component 224. The software application 106 may be configured to execute debugging actions and transmit them using OData protocol to the cloud service component 104. The cloud service component 104 may transmit the actions using a RESTGUI transmission protocol (e.g., using dispatch (<debugID>, RESTGUI) command) to the debugger service component 224, which, in turn, may be configured to transmit the debug request to the debugger user interface component 226 (e.g., using debug (RESTGUI) command). The debugging actions may be displayed and/or controlled in the WebGUI interface 246. Using the WebGUI interface 246, the software application 106 may be configured to obtain debugging solutions from the backend system 112. Results of the debugging actions may be returned to the software application 106. The results may be transmitted using the RESTGUI transmission protocol via the debugger service component 224 and the cloud service component 104 (e.g., using (RESTGUI-Result) command). The cloud service component 104 may be configured to transmit the results to the software application 106 for display. This transmission may be accomplished using OData transmission protocol (e.g., using (OData Result) command). This process may repeat for every debugging request generated by the software application 106.

FIG. 5 illustrates an exemplary user interface 500 that may be displayed by the software application 106, according to some implementations of the current subject matter. The interface 500 may be used to for connection to the debugger 206 (as shown in FIG. 2), e.g., using a "connect" button 502. It may also be used to issue various calls (e.g., REST-CALLs) 504 for debugging actions.

Figure 6:
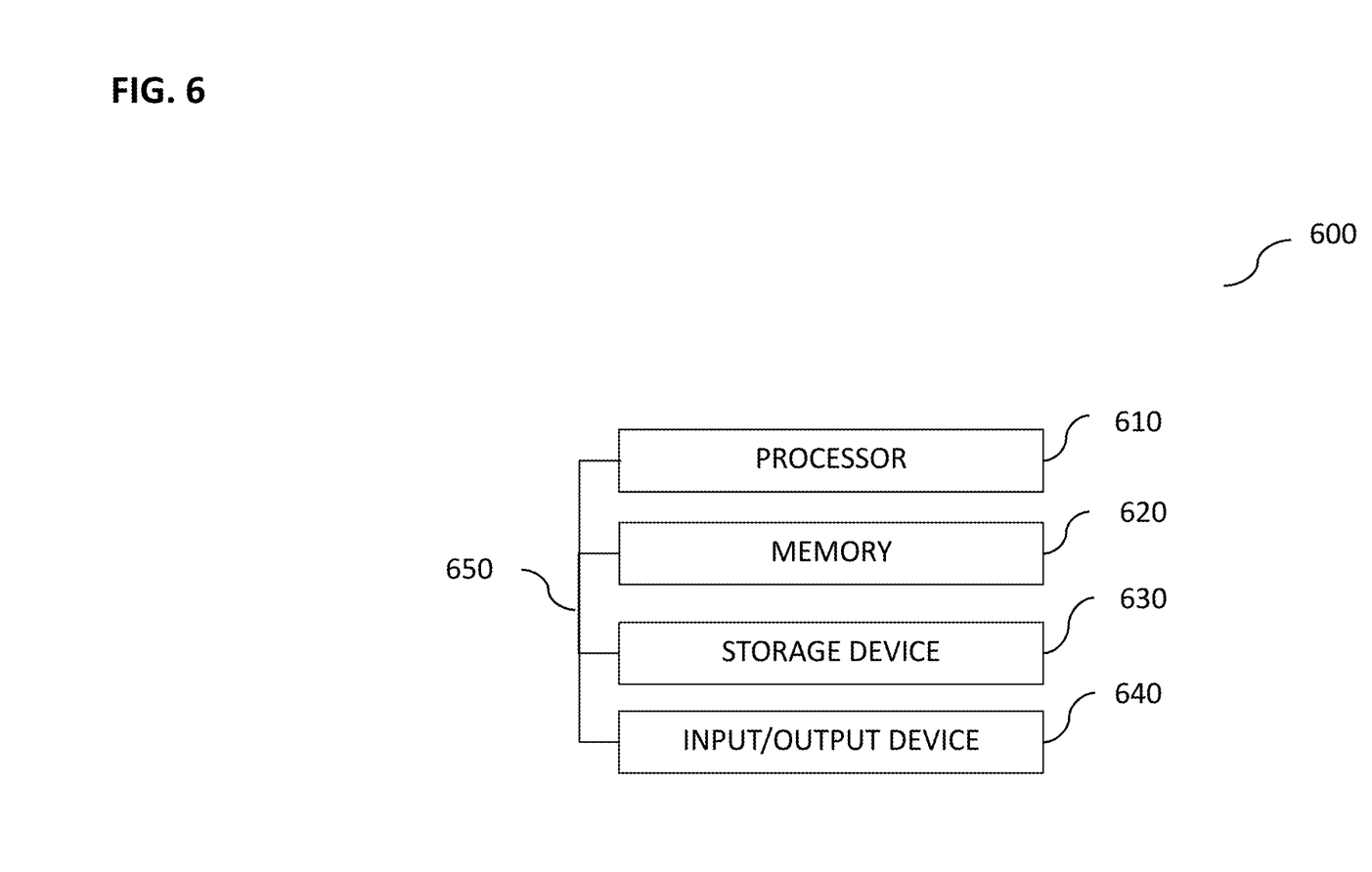
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
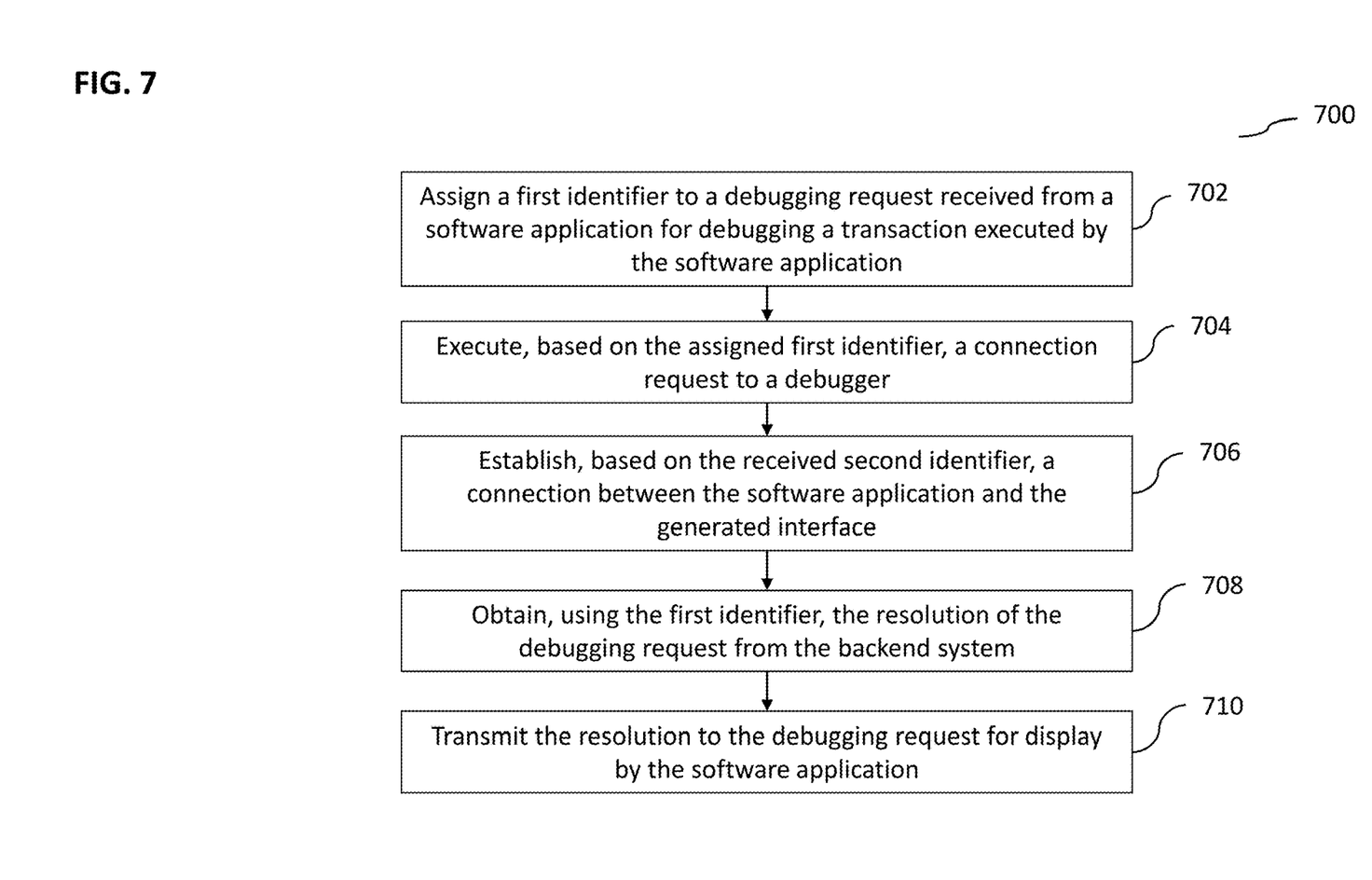
FIG. 7 is an exemplary method, according to some implementations of the current subject matter.

FIG. 7 illustrates an exemplary method 700 for debugging software applications, according to some implementations of the current subject matter. At 702, a first identifier (e.g., debugID) may be assigned to a debugging request received from a software application (e.g., application 106 shown in FIGS. 1-2) for debugging a transaction executed by the software application. The request may be received by the cloud services 104 (e.g., OData services), which may be part of a mobile services 102. Debugger service component 224 may be configured to assign the debugID 234 to the received request.

At 704, a connection request to a debugger (e.g., debugger 206 as shown in FIG. 2) may be executed by the debugger service component 224. The connection request may use the debugID that has been assigned. The debugger may be configured to generate a debugger interface 226 to a backend computing system 112, which may store a resolution of the debugging request. A second identifier (e.g., a session ID) may be associated with the generated interface (e.g., debugger user interface 226).

At 706, a connection between the software application and the generated interface may be established via a WebSocket connection. At 708, the first identifier (e.g., debugID) may be used to obtain the resolution of the debugging request from the backend system 112. At 710, the resolution to the debugging request may be transmitted for display by the software application.

In some implementations, the current subject matter can include one or more of the following optional features. In some implementations, the assigning of the first identifier may include receiving the debugging request from the software application using an open data protocol. The transmission of the resolution may include transmitting the resolution of the debugging request to the software application using an open data protocol.

In some implementations, establishment of the connection may include generating a graphical user interface for display by the software application for controlling the debugging of the transaction executed by the software application. The connection between the software application and the generated interface may be established using a WebSocket protocol. At least one of the executing, the establishing and the obtaining may be performed using a representational state transfer protocol.

In some implementations, the software application may include at least one of the following: a mobile application, a software application being executed on a mobile computing device, a software application being executed on a non-mobile computing device, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    assigning a first identifier to a debugging request received from a software application for debugging, by the software application, a transaction executed by the software application, wherein the assigning further comprises receiving the debugging request from the software application using an open data protocol;
    executing, based on the assigned first identifier, a connection request to a debugger, the debugger generating an interface to a backend computing system storing a resolution of the debugging request, and associating a second identifier with the generated interface;
    establishing, based on the received second identifier, a connection between the software application and the generated interface;
    obtaining, using the first identifier, by the software application, via the generated interface, the resolution of the debugging request from the backend system;
    transmitting the resolution to the debugging request for display and execution by the software application, wherein the transmitting further comprises transmitting the resolution of the debugging request to the software application using an open data protocol; and
    executing, by the software application, the debugging of the transaction using the resolution of the debugging request obtained directly from the backend system.

2. The method according to claim 1, wherein the establishing further comprises generating a graphical user interface for display by the software application for controlling the debugging of the transaction executed by the software application.

3. The method according to claim 1, wherein the connection between the software application and the generated interface is established using a WebSocket protocol.

4. The method according to claim 1, wherein at least one of the executing, the establishing and the obtaining is performed using a representational state transfer protocol.

5. The method according to claim 1, wherein the software application includes at least one of the following: a mobile application, a software application being executed on a mobile computing device, a software application being executed on a non-mobile computing device, and any combination thereof.

6. A system comprising:
    at least one programmable processor; and
    a non-transitory machine-readable medium storing instructions that, when executed by the at least one programmable processor, cause the at least one programmable processor to perform operations comprising:
        assigning a first identifier to a debugging request received from a software application for debugging, by the software application, a transaction executed by the software application, wherein the assigning further comprises receiving the debugging request from the software application using an open data protocol;
        executing, based on the assigned first identifier, a connection request to a debugger, the debugger generating an interface to a backend computing system storing a resolution of the debugging request, and associating a second identifier with the generated interface;
        establishing, based on the received second identifier, a connection between the software application and the generated interface;
        obtaining, using the first identifier, by the software application, via the generated interface, the resolution of the debugging request from the backend system;

transmitting the resolution to the debugging request for display and execution by the software application, wherein the transmitting further comprises transmitting the resolution of the debugging request to the software application using an open data protocol; and executing, by the software application, the debugging of the transaction using the resolution of the debugging request obtained directly from the backend system.

7. The system according to claim 6, wherein the establishing further comprises generating a graphical user interface for display by the software application for controlling the debugging of the transaction executed by the software application.

8. The system according to claim 6, wherein the connection between the software application and the generated interface is established using a WebSocket protocol.

9. The system according to claim 6, wherein at least one of the executing, the establishing and the obtaining is performed using a representational state transfer protocol.

10. The system according to claim 6, wherein the software application includes at least one of the following: a mobile application, a software application being executed on a mobile computing device, a software application being executed on a non-mobile computing device, and any combination thereof.

11. A computer program product comprising a non-transitory machine-readable medium storing instructions that, when executed by at least one programmable processor, cause the at least one programmable processor to perform operations comprising:

assigning a first identifier to a debugging request received from a software application for debugging, by the software application, a transaction executed by the software application, wherein the assigning further comprises receiving the debugging request from the software application using an open data protocol;

executing, based on the assigned first identifier, a connection request to a debugger, the debugger generating an interface to a backend computing system storing a resolution of the debugging request, and associating a second identifier with the generated interface;

establishing, based on the received second identifier, a connection between the software application and the generated interface;

obtaining, using the first identifier, by the software application, via the generated interface, the resolution of the debugging request from the backend system;

transmitting the resolution to the debugging request for display and execution by the software application, wherein the transmitting further comprises transmitting the resolution of the debugging request to the software application using an open data protocol; and executing, by the software application, the debugging of the transaction using the resolution of the debugging request obtained directly from the backend system.

12. The computer program product according to claim 11, wherein the establishing further comprises generating a graphical user interface for display by the software application for controlling the debugging of the transaction executed by the software application.

13. The computer program product according to claim 11, wherein the connection between the software application and the generated interface is established using a WebSocket protocol.

14. The computer program product according to claim 11, wherein at least one of the executing, the establishing and the obtaining is performed using a representational state transfer protocol.

* * * * *